(12) United States Patent
Lan

(10) Patent No.: US 6,951,342 B2
(45) Date of Patent: Oct. 4, 2005

(54) STROLLER WITH AN ADJUSTABLE BACKREST

(76) Inventor: Red Lan, 15F, No. 108, Sec. 1, Hsin Tai 5th Rd., Hsichih, Taipei Hsien (TW)

(*) Notice: Subject to any disclaimer, the term of this patent is extended or adjusted under 35 U.S.C. 154(b) by 102 days.

(21) Appl. No.: 10/622,269

(22) Filed: Jul. 17, 2003

(65) Prior Publication Data

US 2005/0012306 A1 Jan. 20, 2005

(51) Int. Cl.$^7$ ............................................. B62B 7/04
(52) U.S. Cl. .................... 280/47.4; 280/47.38; 297/366
(58) Field of Search .......................... 280/47.4, 47.39, 280/47.38, 647, 650, 658; 297/354.1, 354.12, 363, 366, 377

(56) References Cited

U.S. PATENT DOCUMENTS

| | | | | |
|---|---|---|---|---|
| 2,171,251 A | * | 8/1939 | Capron | 297/370 |
| 2,798,730 A | * | 7/1957 | Smith | 280/649 |
| 4,487,453 A | * | 12/1984 | Emmerich et al. | 297/367 |
| 4,538,830 A | * | 9/1985 | Nakao et al. | 280/647 |
| 4,805,928 A | * | 2/1989 | Nakao et al. | 280/642 |
| 4,986,564 A | * | 1/1991 | Liu | 280/642 |
| 5,246,272 A | * | 9/1993 | Kato et al. | 297/364 |
| 5,669,625 A | * | 9/1997 | Jane Cabagnero | 280/647 |
| 5,749,627 A | * | 5/1998 | Perego | 297/370 |
| 5,806,877 A | * | 9/1998 | Huang | 280/642 |
| 6,322,097 B1 | * | 11/2001 | Lan | 280/642 |
| 6,361,056 B1 | * | 3/2002 | Chen et al. | 280/47.4 |
| 6,581,957 B1 | * | 6/2003 | Lan | 280/642 |
| 6,616,367 B2 | * | 9/2003 | Cheng | 403/85 |
| 6,830,254 B2 | * | 12/2004 | Lan | 280/47.4 |

* cited by examiner

Primary Examiner—Christopher P. Ellis
Assistant Examiner—Jeff Restifo
(74) Attorney, Agent, or Firm—Darby & Darby

(57) ABSTRACT

A stroller includes a leg unit, a seat frame mounted on the leg unit, a backrest frame pivoted to the seat frame, and a positioning mechanism including a base pivoted to the leg unit, a rail unit formed on the backrest frame, a slide unit mounted slidably on the rail unit, a first engaging unit secured to the base, and a second engaging unit secured to the backrest frame. The slide unit is slidable on the rail unit between an engaging position, in which the second engaging unit engages the first engaging unit, and a disengaging position, in which the second engaging unit disengages from the first engaging unit.

6 Claims, 9 Drawing Sheets

STROLLER WITH AN ADJUSTABLE BACKREST

BACKGROUND OF THE INVENTION

1. Field of the Invention

This invention relates to a stroller, more particularly to a stroller with an adjustable backrest.

2. Description of the Related Art

FIGS. 1 and 2 illustrate a conventional stroller 1 that includes a leg unit with front and rear legs 111, 112, a seat frame 113 pivoted to the front and rear legs 111, 112, a backrest 12 with left and right backrest rods 121 pivoted to the seat frame 113, and a positioning unit. The positioning unit includes a pair of engaging pins 131 and a pair of positioning bases 13, each of which is pivoted to a respective one of the rear legs 112, and each of which is formed with a plurality of engaging grooves 135. Each of the engaging pins 131 projects from a respective one of the left and right backrest rods 121 to engage releasably a selected one of the engaging grooves 135 in a respective one of the positioning bases 13. Each of the positioning bases 13 is rotatable upwardly and downwardly between an engaging position, in which the respective engaging pin 131 engages the selected one of the engaging grooves 135, and a disengaging position, in which the respective engaging pin 131 disengages from the selected one of the engaging grooves 135. A releasing member 14 includes a pair of pushing members 146, each of which is mounted slidably on a respective one of the left and right backrest rods 121, and each of which contacts a bottom side of a respective one of the positioning bases 13, a pair of urging members 145, each of which is mounted in a respective one of the left and right backrest rods 121 above a respective one of the pushing members 146 and each of which is connected to the respective one of the pushing members 146, and a handle 141 with a string 143 connected to the pushing members 146 in such a manner that pulling of the handle 141 results in upward movement of the pushing members 146 against urging action of the urging members 145, which, in turn, results in upward movement of the positioning bases 13 to the disengaging position, thereby permitting adjustment of the backrest 12 to a desired position. Each positioning base 13 is restored to the engaging position by virtue of gravity upon being released from the pulling action of the handle 141.

The conventional stroller 1 is disadvantageous in that, since each positioning base 13 is simply laid on the respective engaging pin 131 at the engaging position by gravity, there is a tendency for the positioning base 13 to disengage undesirably from the respective engaging pin 131. Moreover, it is relatively inconvenient and laborious to assemble the releasing member 14. In addition, since each pushing member 146 is connected to a pin extending through a respective one of the let and right backrest rods 121, an elongated sliding slot (not shown) is required to formed in the let and right backrest rods 121 for passage of the pin when the pin is slid together with the respective pushing member 146, which results in decreasing in the mechanical strength of the let and right backrest rods 121. Furthermore, since each pushing member 146 is cylindrical in shape and has an annular sliding contact face that is in sliding contact with the respective one of the let and right backrest rods 121, sliding movement of the same on the respective one of the let and right backrest rods 121 during folding of the stroller is not smooth.

SUMMARY OF THE INVENTION

Therefore, the object of the present invention is to provide a stroller that is capable of overcoming the aforementioned drawbacks of the prior art.

According to the present invention, a stroller comprises: a leg unit; a seat frame mounted on the leg unit; a backrest including a backrest frame that is pivoted to the seat frame and that extends upwardly and rearwardly therefrom in a longitudinal direction, the backrest frame being rotatable frontwardly and rearwardly relative to the seat frame about a first axis; a pivot pin unit; a positioning mechanism including an elongated positioning base that is pivoted to the leg unit through the pivot pin unit so as to permit rotation of the positioning base relative to the leg unit about a second axis parallel to the first axis, that extends upwardly and frontwardly from the pivot pin unit, and that is movably connected to the backrest frame, the positioning mechanism further including an elongated rail unit that is disposed between the positioning base and the backrest frame, that is secured to and that projects from the backrest frame toward the positioning base, and that extends in the longitudinal direction, a slide unit that is mounted slidably on the rail unit and that defines a sliding contact face which is in sliding contact with the rail unit and which is spaced apart from the backrest frame, a first engaging unit secured to the positioning base, a second engaging unit secured to the backrest frame and projecting therefrom toward the first engaging unit, and a pushing unit secured to and projecting from the slide unit to slidingly engage the positioning base so as to rotate the positioning base about the second axis during sliding movement of the slide unit on the rail unit, the slide unit is slidable on the rail unit in the longitudinal direction between an engaging position, in which the second engaging unit releasably engages the first engaging unit, thereby preventing rearward rotation of the backrest frame relative to the seat frame, and a disengaging position, in which the second engaging unit disengages from the first engaging unit, thereby permitting rearward rotation of the backrest frame relative to the seat frame; and a control unit including an operating lever that is mounted rotatably on the backrest frame, and a string that has a first end connected to the operating lever, and a second end opposite to the first end and connected to the slide unit so as to permit upwardly sliding movement of the slide unit together with the positioning base upon rotation of the operating lever relative to the backrest frame.

BRIEF DESCRIPTION OF THE DRAWINGS

In drawings which illustrate an embodiment of the invention.

DETAILED DESCRIPTION OF THE PREFERRED EMBODIMENT

Figure 1:
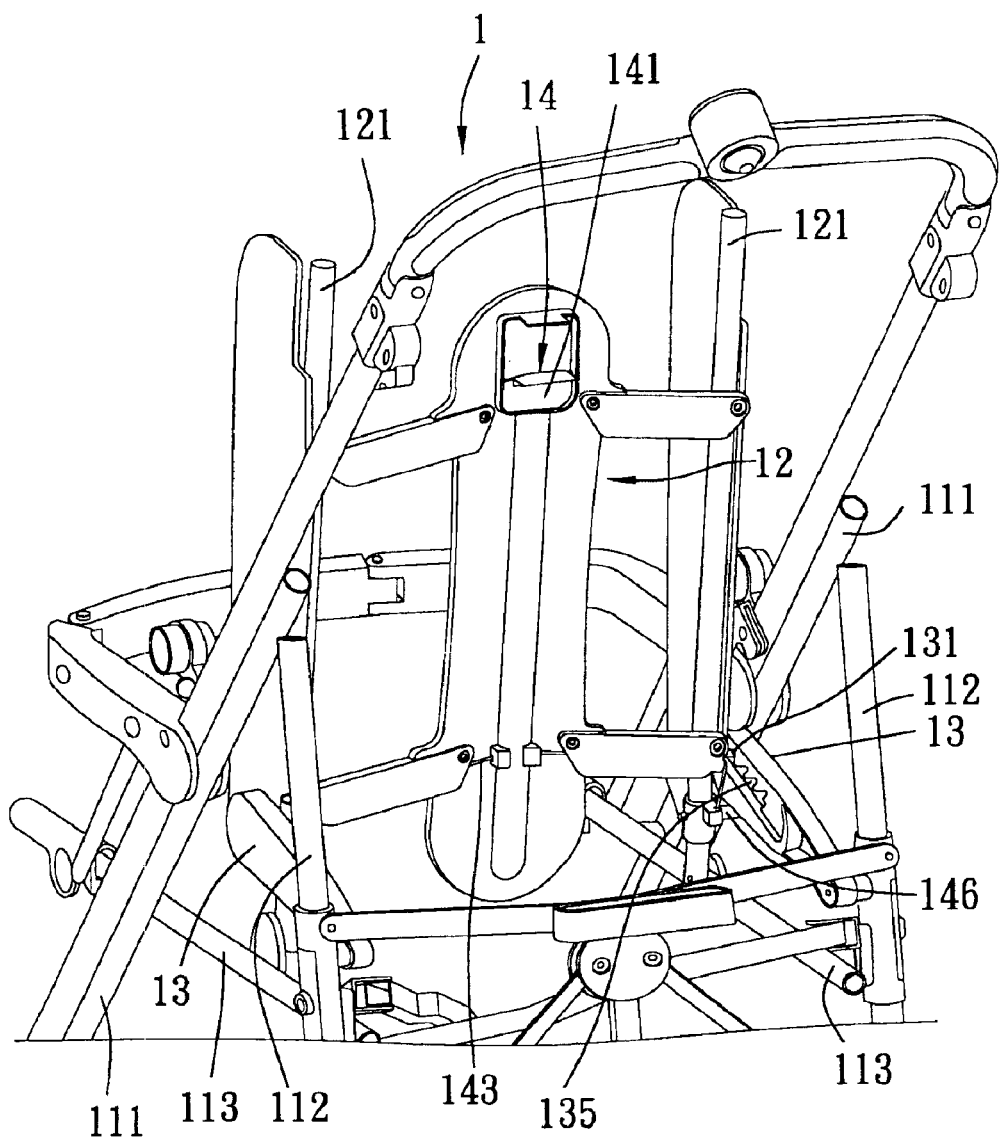
FIG. 1 is a fragmentary perspective view of a conventional stroller.
Figure 2:
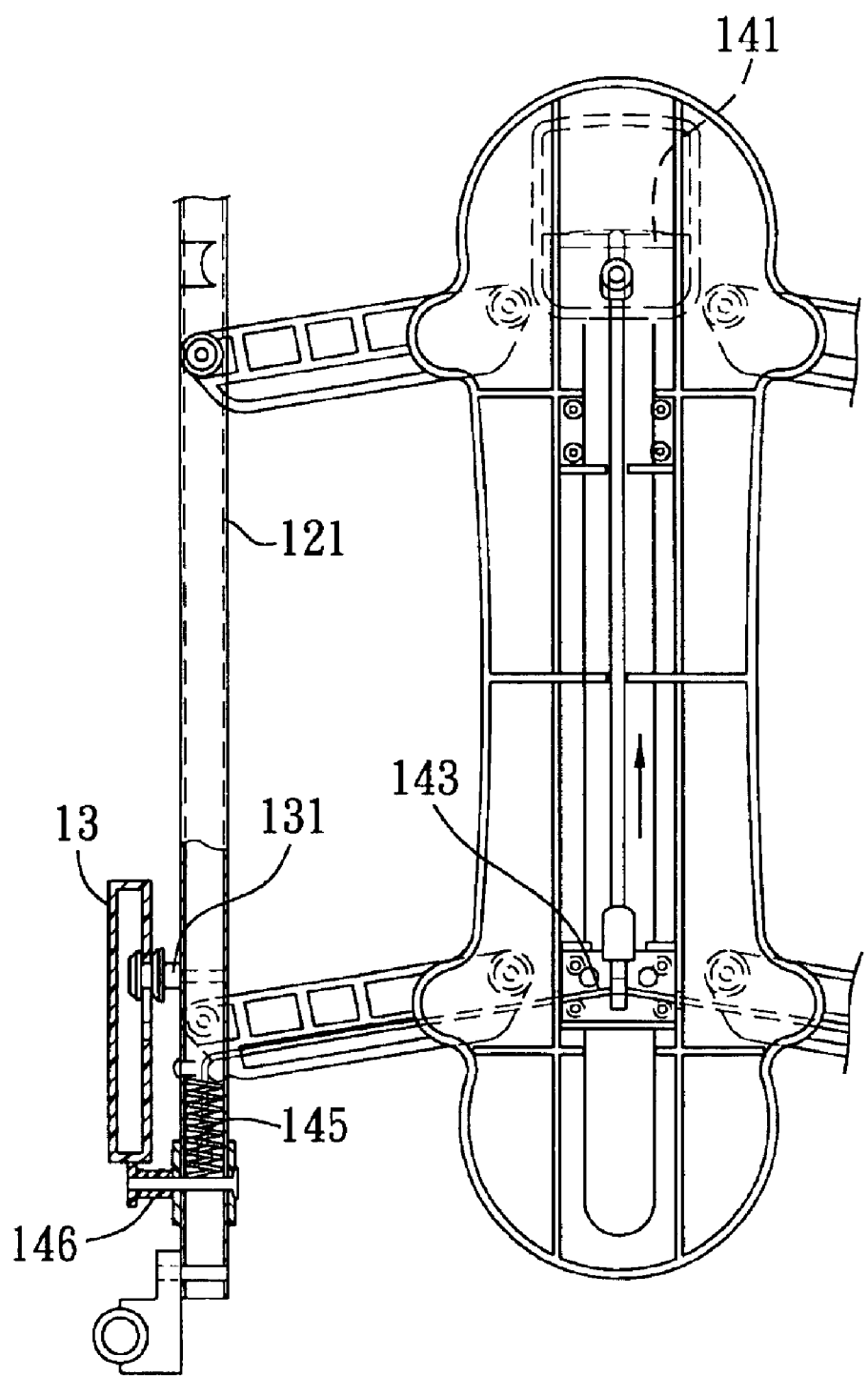
FIG. 2 is a fragmentary front view of a backrest and a positioning unit of the conventional stroller of FIG. 1.
Figure 3:
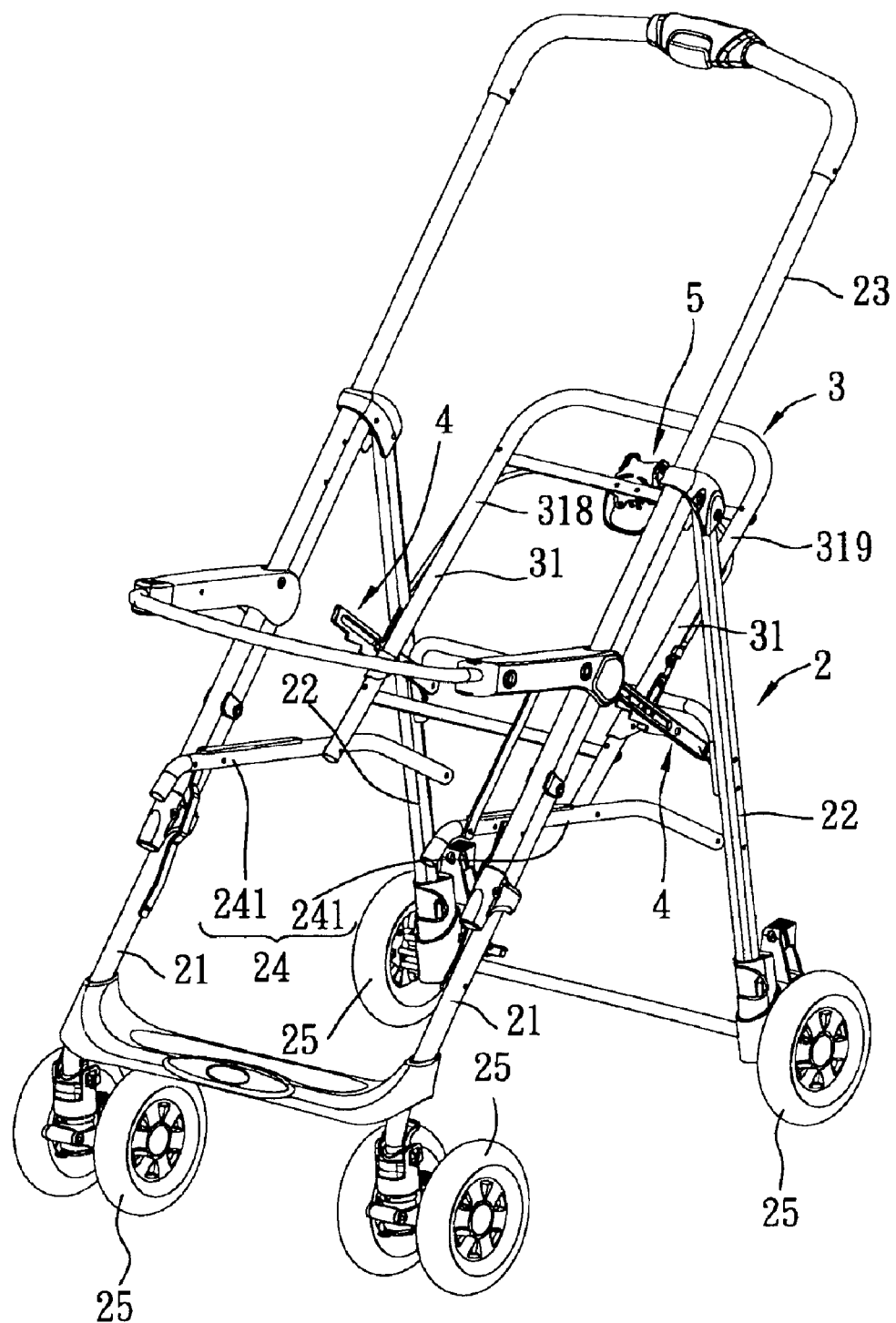
FIG. 3 is a perspective view of a stroller embodying this invention.
Figure 4:
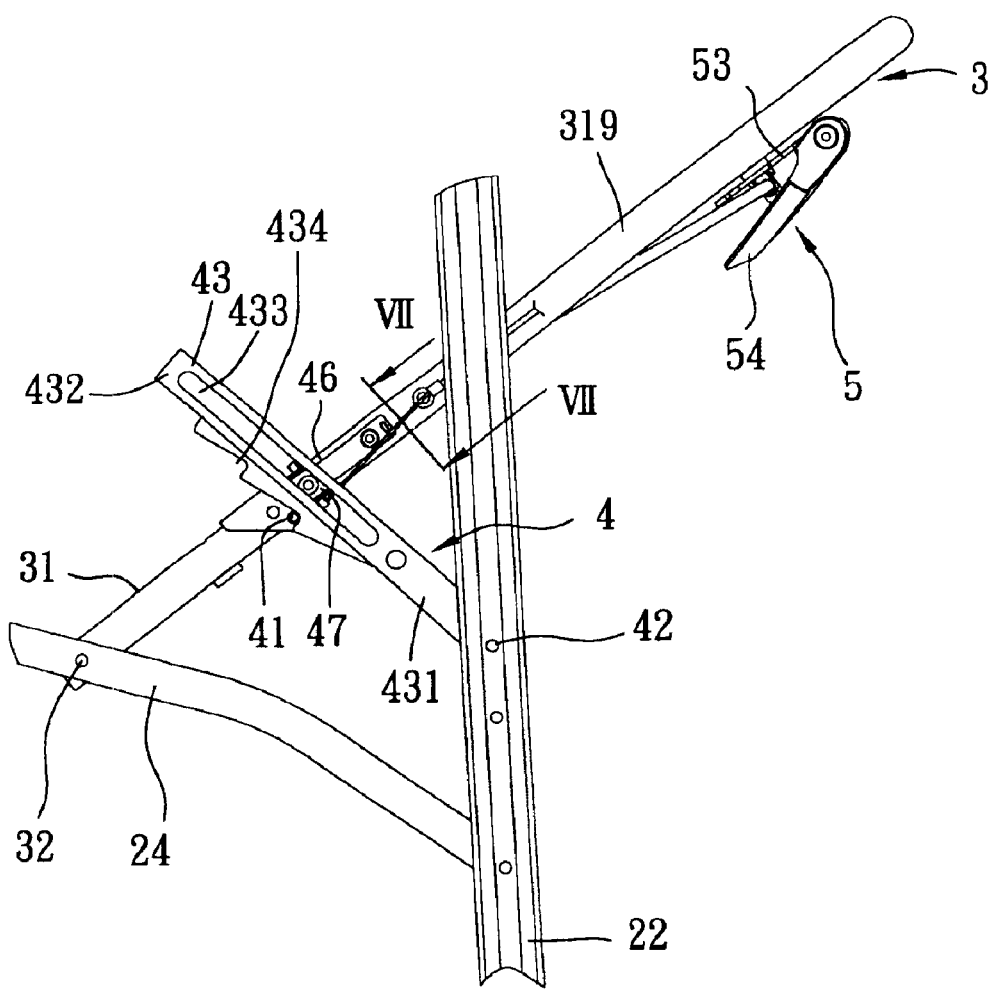
FIG. 4 is a fragmentary side view of the stroller of FIG. 3.
Figure 5:
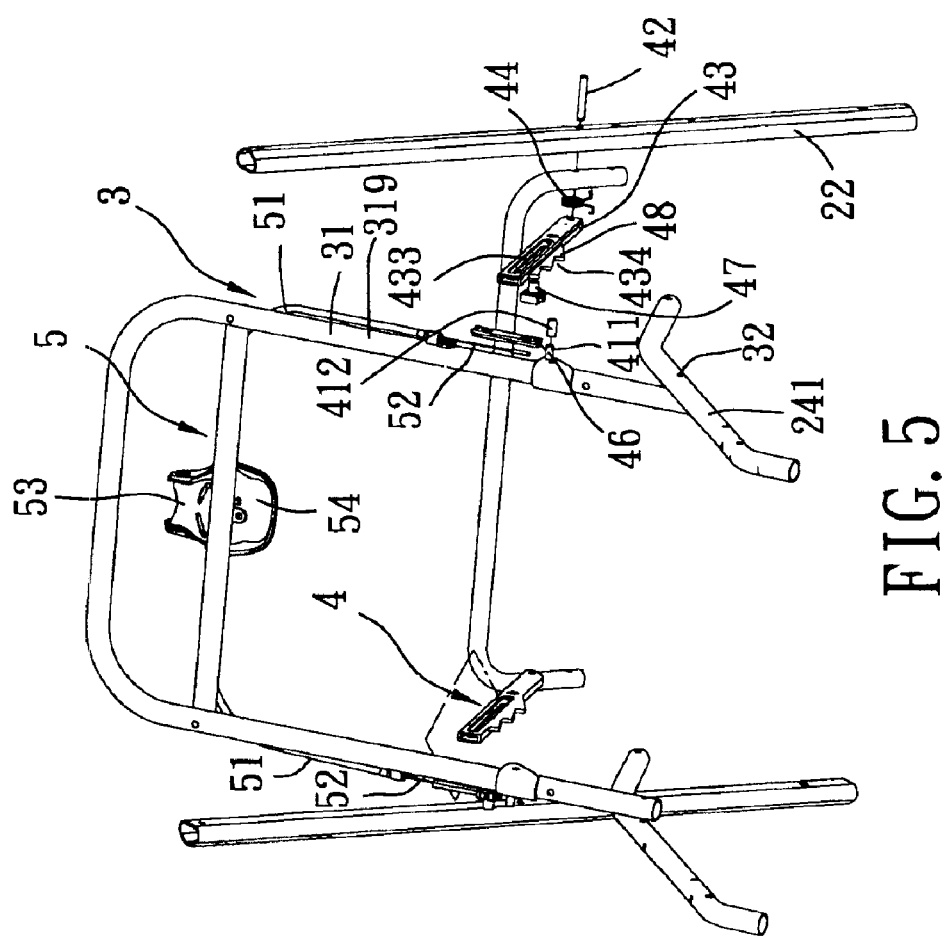
FIG. 5 is a fragmentary partly exploded perspective view of the stroller of FIG. 3.
Figure 6:
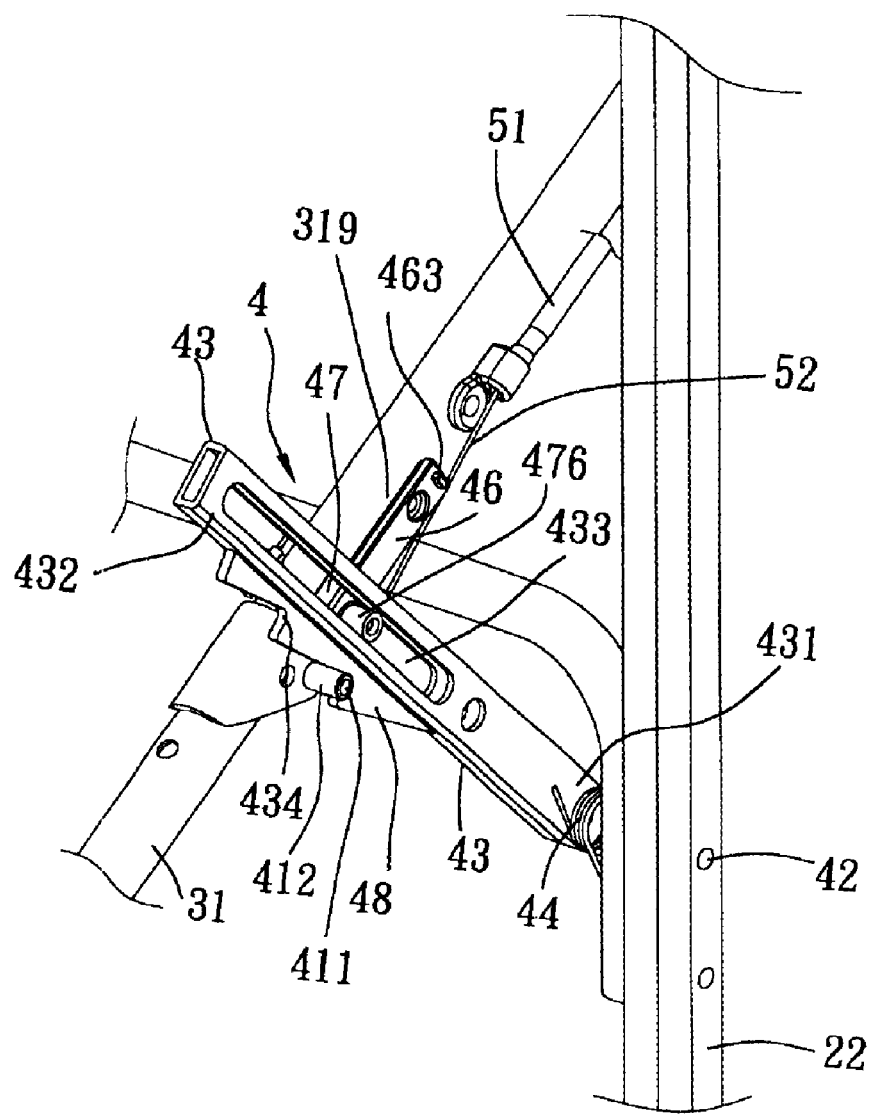
FIG. 6 is a fragmentary perspective view of the stroller of FIG. 3.
Figure 7:
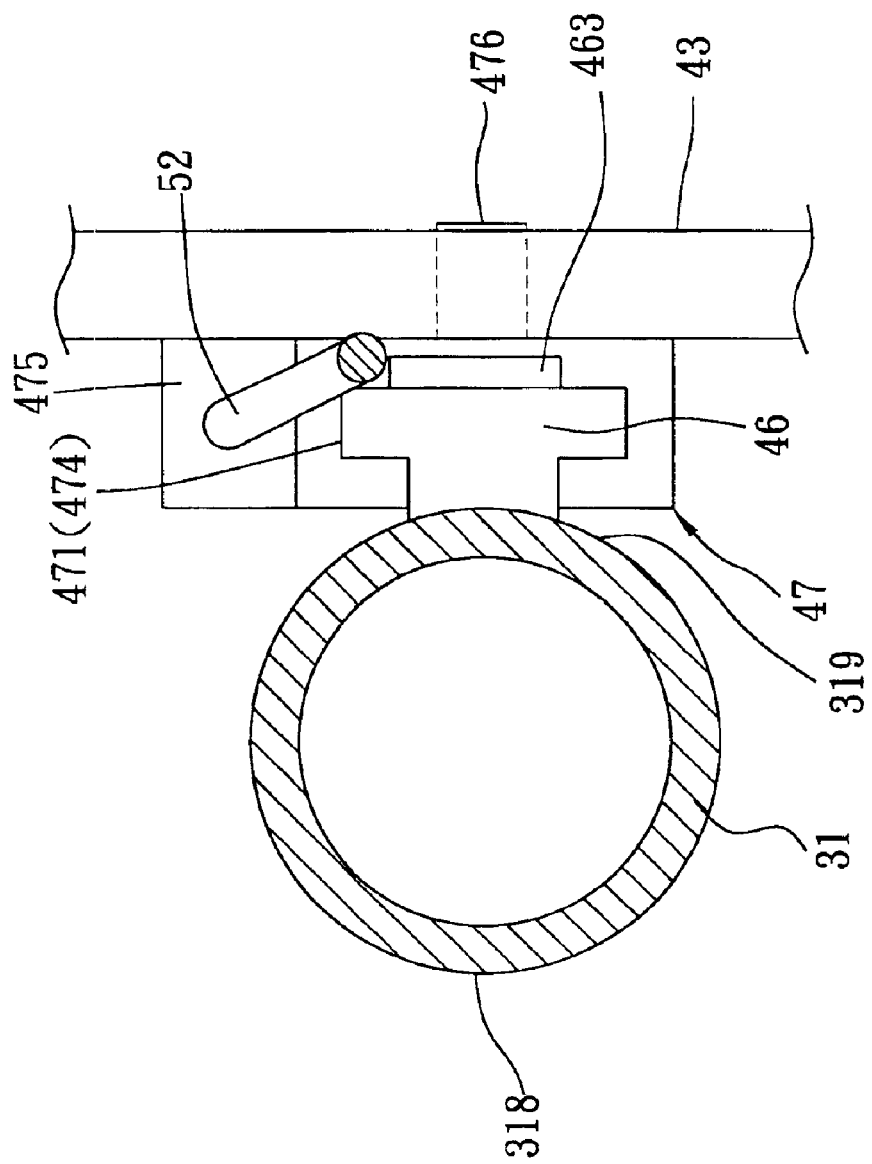
FIG. 7 is a sectional view taken from lines VII—VII in FIG. 4.

FIGS. 3 to 8 illustrate a stroller embodying this invention. The stroller includes: a leg unit 2 with a pair of front legs 21 and a pair of rear legs 22; front and rear wheels 25 mounted rotatably on the leg unit 2; a handle frame 23 connected to the front legs 21; a seat frame 24 with a pair of laterally extending seat rods 241, each of which extends between and is pivoted to an adjacent pair of the front and rear legs 21, 22 of the leg unit 2; a backrest including a backrest frame 3 that has a pair of left and right backrest rods 31, each of which is pivoted to a respective one of the seat rods 241 of the seat frame 24 through a pivot 32, and each of which extends upwardly and rearwardly therefrom in a longitudinal direction, the backrest frame 3 being rotatable frontwardly and rearwardly relative to the seat frame 24 about a first axis defined by the pivot 32, each of the left and right backrest rods 31 of the backrest frame 3 having inner and outer sides 318, 319 that are opposite to each other in a first transverse direction relative to the longitudinal direction, the first transverse direction being parallel to the first axis; and a positioning mechanism 4 including an elongated positioning base that has a pair of elongated left and right base rods 43, each of which has a rear end 431 pivoted to a respective one of the rear legs 22 of the leg unit 2 through a pivot pin 42 of a pivot unit so as to permit rotation of the positioning base relative to the leg unit 2 about a second axis that is defined by the pivot pin 42 and that is parallel to the first axis, and a front end section 432 opposite to the rear end 431. Each of the left and right base rods 43 extends upwardly and frontwardly from the pivot pin 42 in a second transverse direction relative to the backrest rods 31. The front end section 432 of each of the left and right base rods 43 is formed with an elongated slot 433 that extends in the second transverse direction, and is movably connected to a respective one of the left and right backrest rods 31 of the backrest frame 3.

The positioning mechanism 4 further includes an elongated rail unit, a slide unit, first and second engaging units, and a pushing unit.

The rail unit includes a pair of elongated T-shaped rails 46, each of which is formed on the outer side 319 of a respective one of the left and right backrest rods 31 of the backrest frame 3, each of which is disposed between a respective one of the left and right base rods 43 and the respective one of the left and right backrest rods 31, and each of which extends in the longitudinal direction.

Figure 8:
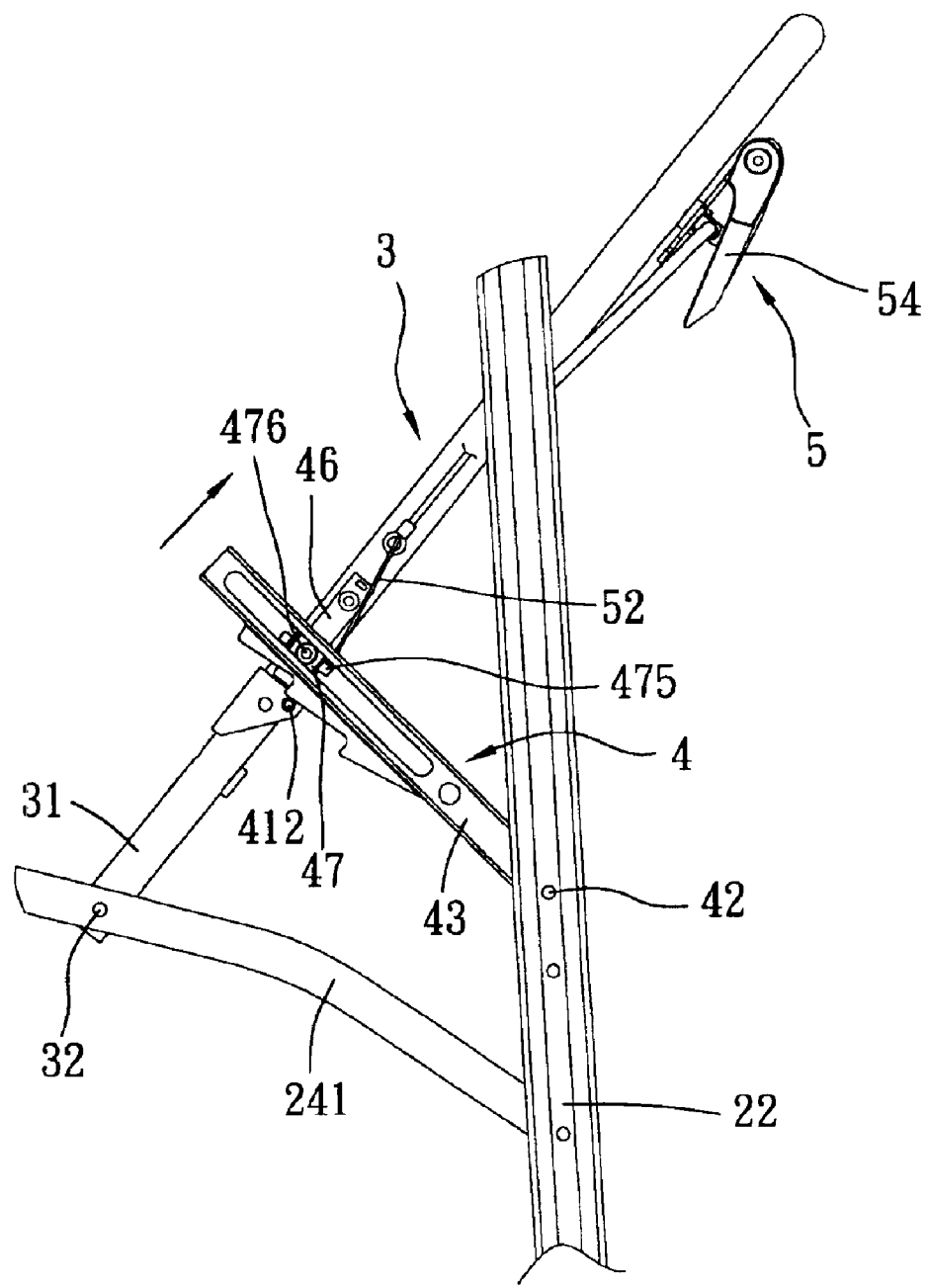
FIG. 8 is a fragmentary side view to illustrate how a sliding unit of the stroller of FIG. 3 is moved from an engaging position to a disengaging position.

The slide unit is mounted and is slidable on the rail unit in the longitudinal direction between an engaging position (see FIGS. 4 and 6) and a disengaging position (see FIG. 8). The slide unit includes a pair of sliding blocks 47, each of which is mounted slidably on a respective one of the rails 46 of the rail unit and each of which defines a T-shaped rail groove 471. Each of the rails 46 has a cross-section conforming to that of the rail groove 471 in a respective one of the sliding blocks 47, and extends into and through the rail groove 471 in the longitudinal direction. Each of the rails 46 has an upper end and a stopper 463 that is disposed adjacent to the upper end and that protrudes therefrom. Each of the sliding blocks 47 engages the stopper 463 of the respective one of the rails 46 when the slide unit is moved upwardly to the disengaging position. Each of the sliding blocks 47 has a sliding contact face 474 that defines the T-shaped rail groove 471 and that is in sliding contact with the respective one of the rails 46 and that is spaced apart from the respective one of the left and right backrest rods 31.

The first engaging unit includes a pair of engaging plates 48, each of which is secured to a bottom end of a respective one of the left and right base rods 43 of the positioning base and each of which is formed with a series of engaging grooves 434 that open downwardly.

The second engaging unit includes a pair of engaging pins 411, each of which is secured to a respective one of the left and right backrest rods 31 of the backrest frame 3 and each of which projects therefrom into a selected one of the engaging grooves 434 in a respective one of the engaging plates 48 of the first engaging unit when the slide unit is disposed at the engaging position so as to position the backrest frame 3 at a desired inclining position relative to the seat frame 24. A pair of protective sleeves 412 are respectively sleeved on the engaging pins 411.

The pushing unit includes a pair of pushing studs 476, each of which is formed on and projects from a respective one of the sliding blocks 47 of the slide unit into the slot 433 in the front end section 432 of a respective one of the left and right base rods 43 so as to slidingly engage the respective one of the left and right base rods 43 of the positioning base, which, in turn, results in rotation of the positioning base about the second axis during sliding movement of the slide unit on the rail unit.

Each of the sliding blocks 47 is disposed at a position adjacent to a lower end of the respective rail 46, and each of the engaging pins 411 of the second engaging unit releasably engages a selected one of the engaging grooves 434 in the respective one of the engaging plates 48 of the first engaging unit when the slide unit is disposed at the engaging position (see FIGS. 4 and 6), thereby preventing rearward rotation of the backrest frame 3 relative to the seat frame 24. Each of the sliding blocks 47 is disposed at a position adjacent to the upper end of the respective rail 46, and each of the engaging pins 411 of the second engaging unit disengages from the selected one of the engaging grooves 434 in the respective one of the engaging plates 48 of the first engaging unit when the slide unit is disposed at the disengaging position (see FIG. 8), thereby permitting rearward rotation of the backrest frame 3 relative to the seat frame 24.

The stroller further includes an urging unit that has a pair of torsion springs 44, each of which is sleeved around the pivot pin 42 and abuts against a respective one of the left and right base rods 43 so as to constantly urge the positioning base in a downward direction and so as to prevent undesired disengagement between the first and second engaging units when the slide unit is disposed at the engaging position.

The stroller further includes a control unit 5 having a lever-mounting seat 53 that is mounted securely on the backrest frame 3, an operating lever 54 that is mounted rotatably on the lever-mounting seat 53, and a pair of strings 52. Each of the strings 52 has a first end connected to the operating lever 54, and a second end opposite to the first end, disposed between a respective one of the left and right backrest rods 31 and a respective one of the left and right base rods 43, and connected to a side portion 475 of a respective one of the sliding blocks 47 (see FIGS. 7 and 8) so as to permit upwardly sliding movement of the sliding blocks 47 together with the left and right base rods 43 upon rotation of the operating lever 54 relative to the backrest frame 3 against urging action of the torsion springs 44. A pair of protective tubes 51 are secured to the lever-mounting seat 53, extend along an exterior of the backrest frame 3, and are respectively sleeved around portions of the strings 52.

Figure 9:
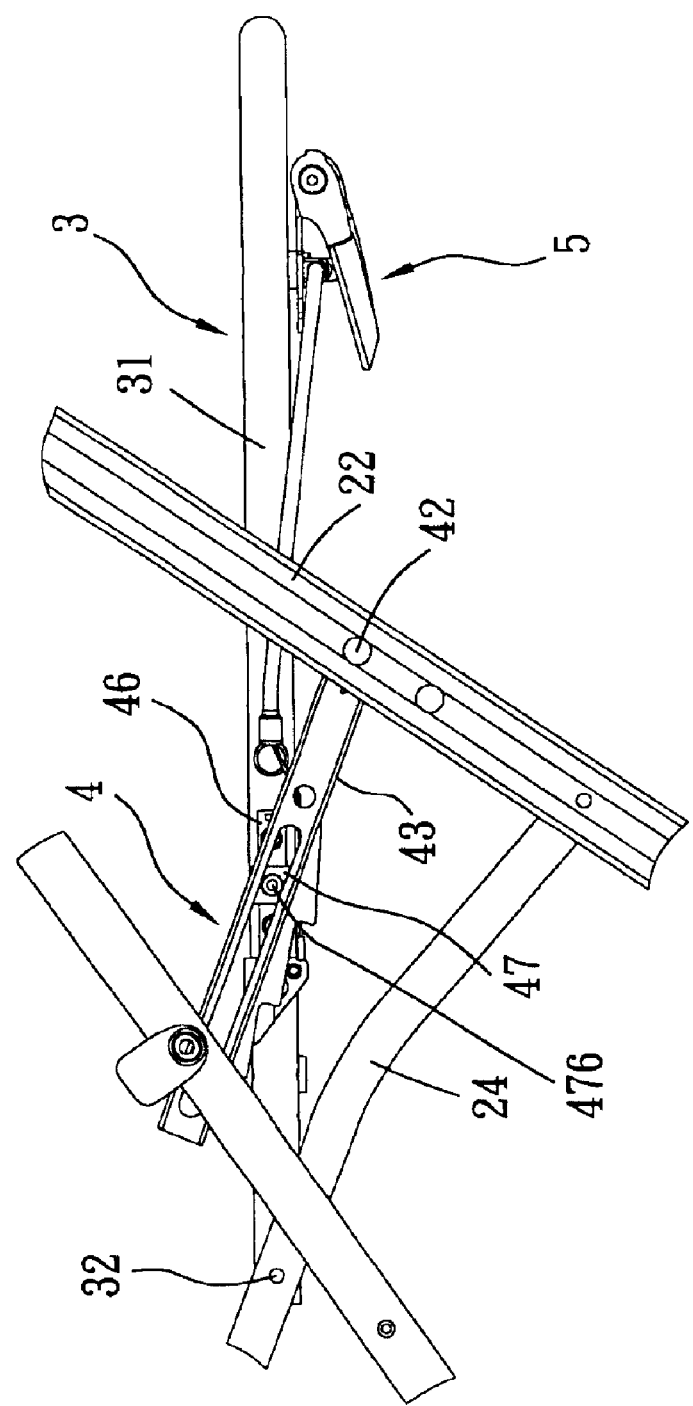
FIG. 9 is a fragmentary side view to illustrate how the stroller of FIG. 3 is folded.

With reference to FIG. 9, by virtue of the T-shaped rails 146 of the rail unit, the stroller of this invention can be easily and smoothly folded by pushing the rear legs 22 to move frontwardly toward the front legs 21.

With the inclusion of the rail unit and the slide unit in the stroller of this invention, the aforesaid drawbacks as encountered in the prior art can be eliminated.

With the invention thus explained, it is apparent that various modifications and variations can be made without departing from the spirit of the present invention. It is therefore intended that the invention be limited only as recited in the appended claims.

I claim:

1. A stroller comprising:

a leg unit;

a seat frame mounted on said leg unit;

a backrest including a backrest frame that is pivoted to said seat frame and that extends upwardly and rearwardly therefrom in a longitudinal direction, said backrest frame being rotatable frontwardly and rearwardly relative to said seat frame about a first axis;

a pivot pin unit;

a positioning mechanism including an elongated positioning base that is pivoted to said leg unit through said pivot pin unit so as to permit rotation of said positioning base relative to said leg unit about a second axis parallel to said first axis, that extends upwardly and frontwardly from said pivot pin unit, and that is movably connected to said backrest frame, said positioning mechanism further including an elongated rail unit that is disposed between said positioning base and said backrest frame, that is secured to said backrest frame, and that extends in said longitudinal direction, a slide unit that is mounted slidably on said rail unit and that defines a sliding contact face which is in sliding contact with said rail unit and which is spaced apart from said backrest frame, a first engaging unit secured to said positioning base, a second engaging unit secured to said backrest frame and projecting therefrom toward said first engaging unit, and a pushing unit secured to and projecting from said slide unit to slidingly engage said positioning base so as to rotate said positioning base about said second axis during sliding movement of said slide unit on said rail unit, said slide unit is slidable on said rail unit in said longitudinal direction between an engaging position, in which said second engaging unit releasably engages said first engaging unit, thereby preventing rearward rotation of said backrest frame relative to said seat frame, and a disengaging position, in which said second engaging unit disengages from said first engaging unit, thereby permitting rearward rotation of said backrest frame relative to said seat frame;

a control unit including a string that has an end connected to said slide unit and that is operable to pull said slide unit to move from said engaging position to said disengaging position; and an urging unit that is sleeved around said pivot pin unit so as to constantly urge said positioning base in a downward direction and so as to prevent undesired disengagement between said first and second engaging units.

2. The stroller of claim 1, wherein said control unit further includes an operating lever that is mounted rotatably on said backrest frame and that is connected to said string so as to permit movement of said string upon rotation of said operating lever relative to said backrest frame.

3. The stroller of claim 1, wherein said backrest frame includes a pair of left and right backrest rods, each of which is pivoted to said seat frame and extends upwardly and rearwardly therefrom, said slide unit including a pair of sliding blocks, each of which defines a T-shaped rail groove extending in said longitudinal direction, said rail unit including a pair of elongated T-shaped rails, each of which is secured to a respective one of said left and right backrest rods, each of which has a cross-section conforming to that of said rail groove in a respective one of said sliding blocks, and each of which extends into and through said rail groove in said longitudinal direction.

4. The stroller of claim 3, wherein each of said rails has an upper end, and a stopper disposed adjacent to said upper end and protruding therefrom, each of said sliding blocks engaging said stopper of the respective one of said rails when said slide unit is moved to said disengaging position.

5. The stroller of claim 4, wherein said positioning base includes elongated left and right base rods, each of which extends in a transverse direction relative to said backrest rods and each of which has a rear end pivoted to said leg unit, and a front end section that is formed with an elongated slot extending in said transverse direction, said pushing unit including a pair of pushing studs, each of which projects from a respective one of said sliding blocks into said slot in said front end section of a respective one of said left and right base rods.

6. The stroller of claim 5, wherein each of said left and right base rods further has a bottom end, said first engaging unit including a pair of engaging plates, each of which is formed on and projects downwardly from said bottom end of a respective one of said left and right base rods, and each of which is formed with a series of engaging grooves that open downwardly, said second engaging unit including a pair of engaging pins, each of which projects from a respective one of said left and right backrest rods into a selected one of said engaging grooves in a respective one of said engaging plates when said slide unit is disposed at said engaging position so as to position said backrest at a desired inclining position relative to said seat frame.

* * * * *